(12) United States Patent
Mizusaki et al.

(10) Patent No.: US 7,758,684 B2
(45) Date of Patent: Jul. 20, 2010

(54) INK ADDITIVE AND INK USING SAME

(75) Inventors: Toru Mizusaki, Takefu (JP); Shuichiro Shinohara, Takefu (JP)

(73) Assignee: Nissin Chemical Industry Co., Ltd., Takefu-Shi (JP)

( * ) Notice: Subject to any disclaimer, the term of this patent is extended or adjusted under 35 U.S.C. 154(b) by 987 days.

(21) Appl. No.: 11/447,874

(22) Filed: Jun. 7, 2006

(65) Prior Publication Data

US 2007/0283845 A1    Dec. 13, 2007

(51) Int. Cl.
*C09D 11/00* (2006.01)

(52) U.S. Cl. .............. 106/31.59; 106/31.89; 106/31.58; 106/31.86

(58) Field of Classification Search ............... 106/31.58, 106/31.86, 31.59, 31.89
See application file for complete search history.

(56) References Cited

U.S. PATENT DOCUMENTS

| 5,514,208 | A | * | 5/1996 | Nagai et al. | 106/31.43 |
| 5,810,915 | A | * | 9/1998 | Nagai et al. | 106/31.43 |
| 6,746,527 | B1 | * | 6/2004 | McElligott et al. | 106/31.65 |

FOREIGN PATENT DOCUMENTS

| JP | 6-24006 A | 2/1994 |
| JP | 8-302263 A | 11/1996 |
| JP | 10-36731 A | 2/1998 |
| JP | 2000-290549 A | 10/2000 |
| JP | 2003-20428 A | 1/2003 |
| JP | 2005-146159 A | 6/2005 |

* cited by examiner

*Primary Examiner*—Jerry Lorengo
*Assistant Examiner*—Veronica Faison Gee
(74) *Attorney, Agent, or Firm*—Westerman, Hattori, Daniels & Adrian, LLP

(57) ABSTRACT

An additive comprising an acetylene glycol or ethylene oxide/propylene oxide adduct of acetylene glycol and a sulfur-containing surfactant is added to a dye and water to form an ink composition which exhibits good wetting, penetrating and dispersing properties due to a reduced dynamic surface tension and complies with the environmental problem.

16 Claims, No Drawings

INK ADDITIVE AND INK USING SAME

CROSS-REFERENCE TO RELATED APPLICATION

This non-provisional application claims priority under 35 U.S.C. §119(a) on Patent Application No. 2003-387508 filed in Japan on Nov. 18, 2003, the entire contents of which are hereby incorporated by reference.

TECHNICAL FIELD

This invention relates to an ink additive and an ink comprising the same. More particularly, it relates to an ink additive which is added to an ink composition that exhibits wetting, penetrating and dispersing properties due to a reduced dynamic surface tension and complies with the environmental problem of the recent concern.

BACKGROUND ART

In the printing, paper making and paint industries, the environmental problem of the recent concern has forced a transition to aqueous systems. As compared with the solvent system, the aqueous system is slow in drying rate and thus low in production speed. For acceptable productivity, a need to speed up the process is perpetually imposed on the aqueous system. It is required to improve ink properties so as to accommodate high-speed printing and high-speed coating.

Under the circumstances, the aqueous ink industry seeks for surfactants having a capability of reducing surface tension for imparting wetting, penetrating and dispersing properties relative to a substrate. The key for a choice of a suitable surfactant is a low static surface tension when the system remains static and a low dynamic surface tension during high-speed operation because of a need to speed up the printing process for higher productivity.

Acetylene glycol surfactants such as acetylene glycol and ethylene oxide derivatives thereof have a good balance of static and dynamic surface tension reducing capabilities, eliminate most drawbacks of prior art nonionic and anionic surfactants and have an antifoaming ability. They have been used as wetting and dispersing agents in ink and paint compositions.

However, the acetylene glycol surfactants have drawbacks including a low solubility in water and solidity at normal temperature. They are thus used in combination with solubilizing agents such as polyethylene glycol and polyoxyethylene nonylphenyl ether for imparting a self-emulsifying ability when added to aqueous ink compositions.

Polyoxyethylene nonylphenyl ether used as the solubilizing agent will encounter more strict legal control because the environmental problem of the recent concern draws attention to the TRI list substances and environmental hormone-containing substances. Under the situation, there is an increasing demand for surfactants which are compliant with the environment, and alternatives have been made by manufacturers.

Some of these alternative solubilizing agents, however, have an increased dynamic surface tension and contact angle. When a combination of acetylene glycol and an alternative solubilizing agent is used in ink, the ink gives rise to problems like cissing, bleeding due to deteriorated absorptivity, and varying spreads of ink on paper depending on the type of paper (or substrate to be printed). This brings about a substantial variation of print quality. The alternatives still fail to provide a measure sufficient to produce versatile color records of quality.

Known patents include JP-A 6-24006 and JP-A 2000-290549.

DISCLOSURE OF THE INVENTION

An object of the present invention is to provide an ink additive which has a reduced dynamic surface tension so that it exhibits improved wetting, penetrating and dispersing properties relative to substrates during printing, allows for high-speed printing, and complies with the problem of solubility in water and the environmental problem. Another object is to provide an ink composition comprising the same.

It has been found that when a surface active combination comprising an acetylene glycol surfactant and a specific sulfur-containing surfactant is used as an additive to ink or the like, the resultant composition exhibits good wetting, penetrating and dispersing properties due to a reduced dynamic surface tension and complies with the environmental problem.

In one aspect, the present invention provides an ink additive comprising (A) 10 to 90% by weight of an acetylene glycol and (B) 10 to 90% by weight of a sulfur-containing surfactant. The acetylene glycol (A) is selected from (i) an acetylene glycol having the general formula (1):

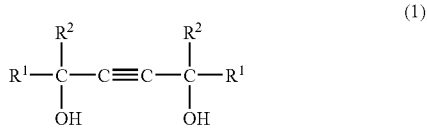

wherein $R^1$ and $R^2$ each are $C_1$—$C_5$ alkyl, (ii) an ethylene oxide/propylene oxide block adduct of acetylene glycol having the general formula (2):

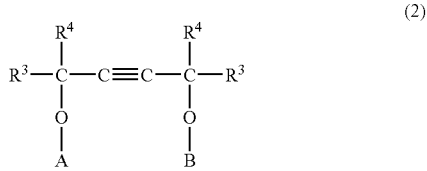

wherein $R^3$ and $R^4$ each are $C_1$-$C_5$ alkyl, A is —$(C_2H_4O)_{w1}$—$(C_3H_6O)_{x1}$—$(C_2H_4O)_{y1}$—$(C_3H_6O)_{z1}$—H, B is —$(C_2H_4O)_{w2}$—$(C_3H_6O)_{x2}$—$(C_2H_4O)_{y2}$—$(C_3H_6O)_{z2}$—H, w1, w2, x1, x2, y1, y2, z1 and z2 each are 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100, (iii) an ethylene oxide/propylene oxide random adduct of acetylene glycol having the general formula (3):

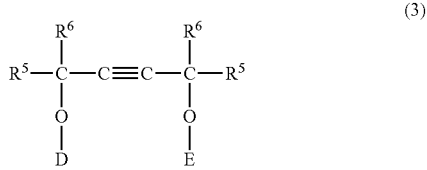

wherein $R^5$ and $R^6$ each are $C_1$-$C_5$ alkyl, D is —$(C_2H_4O/C_3H_6O)_m$—H, E is —$(C_2H_4O/C_3H_6O)_n$—H, m and n each are 0 or a positive number of 0.5 to 50, and m+n is 1 to 100, and (iv) mixtures thereof. The sulfur-containing surfactant (B) is selected from compounds having the general formulae (4) and (5):

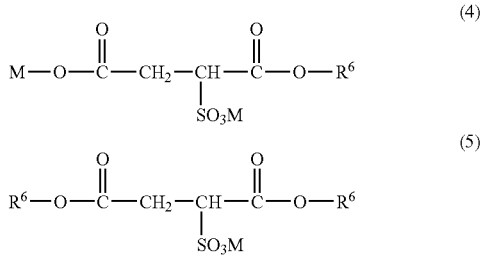

wherein M is independently an alkali metal, alkaline earth metal or ammonium group, and $R^6$ is independently hydrogen or a $C_1$-$C_{20}$ alkyl group. A 0.1 wt % aqueous solution of the ink additive should have a contact angle of equal to or less than 60 degrees after 30 seconds from dropping and a dynamic surface tension of equal to or less than 50 mN/m both at 1 Hz and 10 Hz.

In a preferred embodiment, 20 to 80% by weight of component (A) and 15 to 75% by weight of component (B) are present, and the ink additive further comprises 5 to 15% by weight of deionized water or a water-soluble organic solvent. The organic solvent is typically selected from among ethylene glycol, diethylene glycol, triethylene glycol, tetraethylene glycol, polyethylene glycol, propylene glycol, 1,3-propane diol, 1,4-butane diol, and glycerin. In formulae (4) and (5), M is preferably sodium or potassium. The sulfur-containing surfactant is typically selected from among sodium n-hexylsulfosuccinate, sodium dihexylsulfosuccinate, sodium dioctylsulfosuccinate, sodium di(2-ethylhexyl)sulfosuccinate, potassium di(2-ethylhexyl)sulfosuccinate, sodium diamylsulfosuccinate, sodium 1,3-dimethylethylsulfosuccinate, sodium 1,3-dimethylbutylsulfosuccinate, disodium 2-ethylhexylsulfosuccinate, and dipotassium 2-ethylhexylsulfosuccinate.

In another aspect, the invention provides an ink composition prepared using the ink additive, specifically an ink composition comprising 0.05 to 10% by weight of the additive, and more specifically, an ink composition comprising 0.05 to 10% by weight of the additive, 1 to 10% by weight of a dye, 0 to 50% by weight of an organic solvent, and 30 to 98.95% by weight of water.

BENEFITS OF THE INVENTION

Since the ink prepared using the additive of the invention is reduced in dynamic surface tension, it exhibits good wetting, penetrating and dispersing properties relative to substrates during printing. The ink allows for high-speed printing and complies with the problem of solubility in water and the environmental problem. Because of these advantages, the ink of the invention is very useful in commercial applications.

DESCRIPTION OF THE PREFERRED EMBODIMENTS

The ink additive of the invention comprises (A) an acetylene glycol surfactant and (B) a sulfur-containing surfactant.

Component (A) is at least one acetylene glycol selected from among acetylene glycols having the general formula (1), and alkylene oxide adducts of acetylene glycol having the general formulae (2) and (3).

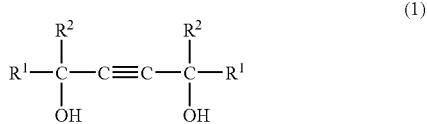

Herein $R^1$ and $R^2$ each are $C_1$-$C_5$ alkyl.

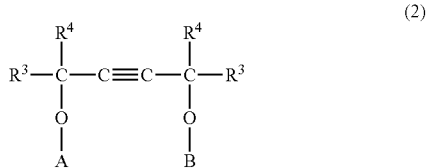

Herein $R^3$ and $R^4$ each are $C_1$-$C_5$ alkyl, A is —$(C_2H_4O)_{w1}$—$(C_3H_6O)_{x1}$—$(C_2H_4O)_{y1}$—$(C_3H_6O)_{z1}$—H, B is —$(C_2H_4O)_{w2}$—$(C_3H_6O)_{x2}$—$(C_2H_4O)_{y2}$—$(C_3H_6O)_{z2}$—H, w1, w2, x1, x2, y1, y2, z1 and z2 each are 0 or a positive number of 0.5 to 25, w1+w2+y1+y2 is 0.5 to 50, x1+x2+z1+z2 is 0.5 to 50, and w1+w2+x1+x2+y1+y2+z1+z2 is 1 to 100, preferably 5 to 85, and more preferably 10 to 85.

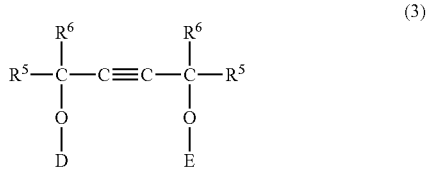

Herein $R^5$ and $R^6$ each are $C_1$-$C_5$ alkyl, D is —$(C_2H_4O/C_3H_6O)_m$—H, E is —$(C_2H_4O/C_3H_6O)_n$—H, m and n each are 0 or a positive number of 0.5 to 50, and m+n is 1 to 100, and preferably 5 to 85.

Illustrative, non-limiting examples of the acetylene glycol having formula (1) include
2,5,8,11-tetramethyl-6-dodecyne-5,8-diol,
5,8-dimethyl-6-dodecyne-5,8-diol,
2,4,7,9-tetramethyl-5-decyne-4,7-diol,
4,7-dimethyl-5-decyne-4,7-diol,
2,3,6,7-tetramethyl-4-octyne-3,6-diol,
3,6-dimethyl-4-octyne-3,6-diol,
2,5-dimethyl-3-hexyne-2,5-diol, etc.

Illustrative, non-limiting examples of the ethylene oxide/propylene oxide block adduct of acetylene glycol having formula (2) include
alkylene oxide adduct of 2,5,8,11-tetramethyl-6-dodecyne-5,8-diol (moles of ethylene oxide added 10, moles of propylene oxide added 40, w1=2 moles, w2=2 moles, x1=8 moles, x2=8 moles, y1=3 moles, y2=3 moles, z1=12 moles, z2=12 moles),
alkylene oxide adduct of 2,5,8,11-tetramethyl-6-dodecyne-5, 8-diol (moles of ethylene oxide added 40, moles of propylene oxide added 10, w1=20 moles, w2=20 moles, x1=5 moles, x2=5 moles, y1=y2=z1=z2=0 mole), alkylene oxide adduct of 5,8-dimethyl-6-dodecyne-5,8-diol (moles of ethylene oxide added 20, moles of propylene oxide added 20, w1=7 moles, w2=7 moles, x1=10 moles, x2=10 moles, y1=3 moles, y2=3 moles, z1=z2=0 mole), alkylene oxide adduct of 5,8-dimethyl-6-dodecyne-5,8-diol (moles of ethylene oxide added 20, moles of propylene oxide added 20, w1=w2=0 mole, x1=10 moles, x2=10 moles, y1=10 moles, y2=10 moles, z1=z2=0 mole), alkylene oxide adduct of 2,4,7,9-tetramethyl-5-decyne-4,7-diol (moles of ethylene oxide added 20, moles of propylene oxide added 10, w1=3 moles, w2=3 moles, x1=1 mole, x2=1 mole, y1=7 moles, y2=7 moles, z1=4 moles, z2=4 moles), alkylene oxide adduct of 2,4,7,9-tetramethyl-5-decyne-4,7-diol (moles of ethylene oxide added 20, moles of propylene oxide added 10, w1=10 moles, w2=10 moles, x1=5 moles, x2=5 moles, y1=y2=z1=z2=0 mole), alkylene oxide adduct of 4,7-dimethyl-5-decyne-4,7-diol (moles of ethylene oxide added 30, moles of propylene oxide added 6, w1=7 moles, w2=7 moles, x1=3 moles, x2=3 moles, y1=8 moles, y2=8 moles, z1=z2=0 mole), alkylene oxide adduct of 4,7-dimethyl-5-decyne-4,7-diol (moles of ethylene oxide added 30, moles of propylene oxide added 6, w1=w2=0 mole, x1=1 mole, x2=1 mole, y1=15 moles, y2=15 moles, z1=2 moles, z2=2 moles), alkylene oxide adduct of 2,3,6,7-tetramethyl-4-octyne-3,6-diol (moles of ethylene oxide added 8, moles of propylene oxide added 4, w1=2 moles, w2=2 moles, x1=1 mole, x2=1 mole, y1=2 moles, y2=2 moles, z1=1 mole, z2=1 mole), alkylene oxide adduct of 3,6-diethyl-4-octyne-3,6-diol (moles of ethylene oxide added 24, moles of propylene oxide added 18, w1=5 moles, w2=5 moles, x1=9 moles, x2=9 moles, y1=7 moles, y2=7 moles, z1=z2=0 mole), alkylene oxide adduct of 3,6-dimethyl-4-octyne-3,6-diol (moles of ethylene oxide added 36, moles of propylene oxide added 26, w1=10 moles, w2=10 moles, x1=5 moles, x2=5 moles, y1=8 moles, y2=8 moles, z1=8 moles, z2=8 moles), alkylene oxide adduct of 2,5-dimethyl-3-hexyne-2,5-diol (moles of ethylene oxide added 44, moles of propylene oxide added 40, w1=8 moles, w2=8 moles, x1=4 moles, x2=4 moles, y1=14 moles, y2=14 moles, z1=16 moles, z2=16 moles), etc.

Illustrative, non-limiting examples of the ethylene oxide/propylene oxide random adduct of acetylene glycol having formula (3) include alkylene oxide adduct of 2,5,8,11-tetramethyl-6-dodecyne-5,8-diol (moles of ethylene oxide added 20, moles of propylene oxide added 20, m=20 moles, n=20 moles), alkylene oxide adduct of 5,8-dimethyl-6-dodecyne-5,8-diol (moles of ethylene oxide added 10, moles of propylene oxide added 10, m=12 moles, n=8 moles), alkylene oxide adduct of 2,4,7,9-tetramethyl-5-decyne-4,7-diol (moles of ethylene oxide added 15, moles of propylene oxide added 15, m=13 moles, n=17 moles), alkylene oxide adduct of 4,7-dimethyl-5-decyne-4,7-diol (moles of ethylene oxide added 27, moles of propylene oxide added 27, m=27 moles, n=27 moles), alkylene oxide adduct of 2,3,6,7-tetramethyl-4-octyne-3,6-diol (moles of ethylene oxide added 2.5, moles of propylene oxide added 2.5, m=2.5 moles, n=2.5 moles), alkylene oxide adduct of 3,6-diethyl-4-octyne-3,6-diol (moles of ethylene oxide added 21, moles of propylene oxide added 21, m=20 moles, n=22 moles), alkylene oxide adduct of 3,6-dimethyl-4-octyne-3,6-diol (moles of ethylene oxide added 31, moles of propylene oxide added 31, m=27 moles, n=35 moles), alkylene oxide adduct of 2,5-dimethyl-3-hexyne-2,5-diol (moles of ethylene oxide added 42, moles of propylene oxide added 42, m=42 moles, n=42 moles), etc.

In formulae (2) and (3), the total molar amount of addition alkylene oxide units is 1 to 100 moles, preferably 5 to 85 moles, and more preferably 10 to 85 moles. If the total molar amount of addition alkylene oxide units exceeds 100 moles, both the static and dynamic surface tensions become higher, losing the wetting effect.

In formulae (2) and (3), the total molar amount of addition ethylene oxide units is preferably 0.5 to 50 moles, and more preferably 10 to 40 moles, and the total molar amount of addition propylene oxide units is preferably 0.5 to 50 moles, and more preferably 10 to 40 moles. If the total molar amount of addition ethylene oxide units exceeds 50 moles, water solubility becomes higher, but antifoaming property lowers, leading to the instability of ink during discharge; and if the same is less than 0.5 mole, solubility declines. If the total molar amount of addition propylene oxide units exceeds 50 moles, antifoaming property becomes better, but solubility lowers, allowing agglomerates to form; and if the same is less than 0.5 mole, dispersing and antifoaming properties decline.

The acetylene glycols serving as component (A) may be used alone or in admixture of two or more. In preparing the ink additive of the invention, the acetylene alcohol is included in an amount of 10 to 90% by weight, preferably 20 to 80% by weight based on the total weight of the additive. An acetylene alcohol content of more than 90 wt % has negative impacts such as low solubility in water, possible agglomeration during compounding into an ink composition, weak surface tension-reducing effect, and cissing. An acetylene alcohol content of less than 10 wt % leads to more foaming, a reduced print density and a reduced print image resolution.

Component (B) to be combined with the acetylene alcohol (A) is a sulfur-containing surfactant having the general formula (4) and/or (5):

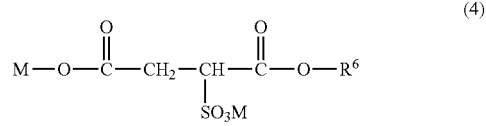

(4)

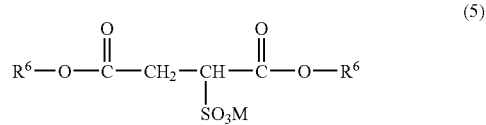

(5)

wherein M is independently an alkali metal, alkaline earth metal or ammonium group, and $R^6$ is independently hydrogen or a $C_1$-$C_{20}$ alkyl group. Preferably, M is sodium or potassium, and $R^6$ is butyl, amyl, hexyl, octyl, nonyl or dodecyl.

Illustrative, non-limiting examples of the sulfur-containing surfactants having formulae (4) and (5) include sodium n-hexylsulfosuccinate, sodium dihexylsulfosuccinate, sodium dioctylsulfosuccinate, sodium di(2-ethylhexyl)sulfosuccinate, potassium di(2-ethylhexyl)sulfosuccinate, sodium diamylsulfosuccinate, sodium 1,3-dimethylethylsulfosuccinate, sodium 1,3-dimethylbutylsulfosuccinate, disodium 2-ethylhexylsulfosuccinate, and dipotassium 2-ethylhexylsulfosuccinate.

The sulfur-containing surfactants having formulae (4) and (5) serving as component (B) may be used alone or in admixture of two or more. In preparing the ink additive of the invention, the sulfur-containing surfactant is included in an amount of 10 to 90% by weight, preferably 15 to 75% by weight based on the total weight of the additive. A sulfur-containing surfactant content of less than 10 wt % fails to fully solubilize the acetylene glycol (A), allowing agglomeration. A sulfur-containing surfactant content of more than 90 wt % induces more foaming during compounding into an ink composition, resulting in retarded discharge and defective printing.

Although the invention prefers to use components (A) and (B) in such amounts that their total is 100% by weight, the ink additive of the invention may further include deionized water or a water-soluble organic solvent as a third typically selected from among ethylene glycol, diethylene glycol, triethylene glycol, tetraethylene glycol, polyethylene glycol, propylene glycol, 1,3-propane diol, 1,4-butane diol, and glycerin. Component (C) is used in an amount of 0 to 25% by weight, preferably 5 to 15% by weight based on the total weight of the ink additive as long as this does not compromise the benefits of the ink additive.

The ink additive of the invention is prepared by mixing the above-described components by well-known admixing/milling techniques using a propeller agitator or the like. The component which is solid at room temperature is heated, if necessary, prior to mixing.

The ink additive thus obtained should meet the following requirements. A 0.1 wt % aqueous solution of the ink additive has a contact angle of equal to or less than 60 degrees, preferably 10 to 50 degrees, and more preferably 20 to 45 degrees, after 30 seconds from dropping and a dynamic surface tension of equal to or less than 50 mN/m, preferably 10 to 50 mN/m, and more preferably 25 to 50 mN/m, both at 1 Hz and 10 Hz. If the contact angle of a droplet of 0.1 wt % additive aqueous solution exceeds 60 degrees after 30 seconds from dropping, the ink composition having the additive compounded therein becomes less absorptive and results in bleeding. If the dynamic surface tension at 1 Hz and 10 Hz of 0.1 wt % additive aqueous solution exceeds 50 mN/m, the ink composition having the additive compounded therein gives rise to cissing and bleeding due to a lack of penetrating power when printed by means of a printing machine such as a printer.

It is noted that the contact angle is determined by using a contact angle meter model CA-D (Kyowa Interface Science Co., Ltd.), dropping a 0.1 wt % aqueous solution of the ink additive and measuring the droplet after 30 seconds. The dynamic surface tension is determined by using a bubble pressure tensiometer KRUSS BP-2 (KRUSS GmbH) and measuring the dynamic surface tension of a 0.1 wt % aqueous solution of the ink additive at a bubble frequency of 1 Hz and 10 Hz.

When compounded in an ink composition, the ink additive of the invention serves to reduce the dynamic surface tension and exerts satisfactory wetting, penetrating, antifoaming and dispersing properties so that the ink composition lends itself to high-speed printing process while complying with the environmental problem.

In preparing an ink composition, the additive of the invention is preferably used in an amount of 0.05 to 10% by weight, more preferably 0.05 to 5% by weight based on the total weight of the ink composition.

The ink composition may include aqueous dyes or the like as a colorant, preferably in an amount of 1 to 10% by weight based on the total weight of the ink composition. Suitable aqueous dyes include, but are not limited to, acid dyes, basic dyes and direct dyes, such as, for example, Direct Black 19, Acid Black 24, Direct Red 9, Direct Yellow 23, Acid Yellow 42, Direct Blue 86 and Acid Blue 9.

The ink composition may include an organic solvent as a penetrating agent and dye solubilizer, preferably in an amount of up to 50% by weight based on the total weight of the ink composition. Suitable organic solvents include ethylene glycol, diethylene glycol, propylene glycol, polyethylene glycol, ethylene glycol monomethyl ether, methyl carbitol, and glycerin.

In the ink composition of the invention, water is used as the liquid in which the aqueous dye is dissolved and dispersed. Deionized water is typically used for dye stability.

Any of well-known additives may be compounded in the ink composition of the invention. Examples include, but are not limited to, pH adjusting agents such as potassium carbonate, sodium carbonate and triethanol amine, mildew-proofing agents such as sodium benzoate, and chelating agents such as sodium diethylenetriaminepentaacetate.

The ink composition is typically suited for use as jet printing ink or aqueous gravure ink.

EXAMPLE

Examples and Comparative Examples are given below for further illustrating the invention, but the invention is not limited thereto. All parts and percents are by weight.

Example 1

40 parts of 2,4,7,9-tetramethyl-5-decyne-4,7-diol (Surfynol 104 by Air Products) was preheated at 60° C. and admitted into a vessel equipped with an agitator. With agitating, 62.5 parts of a 80% aqueous solution of sodium di(2-ethylhexyl)sulfosuccinate and 10 parts of ethylene glycol were slowly added to the vessel. The mixture was continuously agitated for 2 hours and cooled to room temperature. Filtration through a 200-mesh fabric filter gave an ink additive labeled M-1.

A 0.1% aqueous solution of the additive was prepared by adding 0.1 part of additive M-1 to 100 parts of deionized water, and stirring by means of a magnetic stirrer. This aqueous solution was determined for outer appearance, contact angle, dynamic surface tension and static surface tension, with the results shown in Table 2.

Also, an ink composition was prepared by using the ink additive and other components according to the formulation shown below. The ink composition was tested for print density, dot diameter, printed image resolution and ink receptivity, with the results shown in Table 3.

Ink Formulation

With stirring by a propeller agitator, 5 parts of a dye Cibafix Direct Black 19 (trade mark of Ciba Geigy) was slowly added to 70 parts of deionized water. Then 1 part of ink additive M-1, 10 parts of polyethylene glycol, and 15 parts of glycerin were added, followed by one hour of stirring. There was obtained black (B) ink composition labeled Ink-1.

Similarly magenta (M), cyan (C) and yellow (Y) ink compositions were prepared using Cibafix Direct Red 9, Cibafix Direct Blue 86 and Cibafix Direct Yellow 23 (trade marks of Ciba Geigy) instead of the above dye.

The tests are described below.

Evaluation of Ink Additive

1. Appearance of Aqueous Solution

A 0.1% aqueous solution of the additive was observed for outer appearance and whether insoluble deposits were present.

◯: solution is clear, no insoluble deposits found

Δ: solution is white turbid, no insoluble deposits found
x: some insoluble deposits found
xx: little or not dissolved 2. Contact Angle Using a contact angle meter CA-D (Kyowa Interface Science Co., Ltd.), the contact angle of a droplet of a 0.1% aqueous solution of the additive was measured after 30 seconds from dropping.

3. Dynamic Surface Tension

Using a bubble pressure tensiometer KRUSS BP-2 (KRUSS GmbH), the dynamic surface tension of a 0.1 wt % aqueous solution of the additive was measured at a frequency of 1 Hz and 10 Hz.

4. Static Surface Tension

Using a tensiometer ESB-V (Kyowa Interface Science Co., Ltd.), the static surface tension of a 0.1 wt % aqueous solution of the additive was measured.

Evaluation of Ink Composition

1. Print Density

An ink-jet printer BJC455J (Canon Inc.) was operated to print dot images using the black (B) ink composition. The dot density of printed image was measured by a micro-densitometer PDM-5 (Sakura Seiki Co., Ltd.).

2. Dot Diameter

After printing as above using the black (B) ink composition, the printed image was enlarged by a magnification of 100× and the diameter of dots was measured.

3. Resolution of Printed Image

The ink-jet printer BJC455J was operated to print solid images using the black (B) ink composition. Resolution was measured by a Macbeth densitometer RD-918. For the magenta (M), cyan (C) and yellow (Y) ink compositions, resolution was similarly measured.

4. Ink Receptivity

The ink-jet printer BJC455J was operated to inject the black (B), magenta (M), cyan (C) and yellow (Y) ink compositions to a common spot on paper at the same time. After 1 second, the spot was rubbed with a fastener plate. Rating was made by observing how the white area around the spot was smeared.

○: not smeared
Δ: slightly smeared
x: noticeably smeared

Examples 2-7 & Comparative Examples 1-8

Ink additives M-2 to M-15 were prepared as in Example 1 by mixing and agitating components, the type and amount (%) of which are shown in Table 1. Those components which were solid at room temperature were heated at 60° C. prior to mixing. It is noted that the amounts (%) of components used in Example 1 are reproduced in Table 1.

As in Example 1, 0.1% aqueous solutions of the additives were prepared and evaluated, with the results shown in Table 2.

Further as in Example 1, ink compositions were prepared and evaluated, with the results shown in Table 3. Ink compositions Ink-2 to Ink-15 in Table 3 correspond to the use of ink additives M-2 to M-15, respectively.

TABLE 1

| | | Example | | | | | | | Comparative Example | | | | | | | |
|---|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 | 8 |
| Ink additive | | M-1 | M-2 | M-3 | M-4 | M-5 | M-6 | M-7 | M-8 | M-9 | M-10 | M-11 | M-12 | M-13 | M-14 | M-15 |
| | | | | | Blending amount (%) | | | | | | | | | | | |
| Component A | A-1 | 40 | | | | | | | 92 | 5 | | | | | | |
| | A-2 | | 30 | | | | | | | | 95 | | | | | |
| | A-3 | | | 50 | | | | | | | | 98 | | | | |
| | A-4 | | | | 30 | | | | | | | | | | | |
| | A-5 | | | | | 40 | | | | | | | | | | |
| | A-6 | | | | | | 20 | | | | | | | | | |
| | A-7 | | | | | | | 80 | | | | | | | | |
| | A-8 | | | | | | | | | | | | 2 | | | |
| | A-9 | | | | | | | | | | | | | 50 | | 95 |
| | A-10 | | | | | | | | | | | | | | 70 | |
| Component B | B-1 | 50 | | | | 60 | | | 8 | 95 | | | | 40 | | |
| | B-2 | | 70 | | | | 75 | | | | 5 | | | | 25 | |
| | B-3 | | | 40 | | | | 15 | | | | 2 | | | | 5 |
| | B-4 | | | | 65 | | | | | | | | 98 | | | |
| Component C | ethylene glycol | 10 | | | | | | | | | | | | 10 | | |
| | propylene glycol | | | 10 | | | | | | | | | | | 5 | |
| | polyethylene glycol | | | | 5 | | | | | | | | | | | |
| | glycerin | | | | | | 5 | | | | | | | | | |
| | deionized water | | | | | | | 5 | | | | | | | | |

Component A

A-1: 2,4,7,9-tetramethyl-5-decyne-4,7-diol

A-2: 2,5,8,11-tetramethyl-6-dodecyne-5,8-diol

A-3: 5,8-dimethyl-6-dodecyne-5,8-diol

A-4: alkylene oxide adduct of 2,4,7,9-tetramethyl-5-decyne-4,7-diol (moles of ethylene oxide added 20, moles of propylene oxide added 10, w1=3 moles, w2=3 moles, x1=1 mole, x2=1 mole, y1=7 moles, y2=7 moles, z1=4 moles, z2=4 moles)

A-5: alkylene oxide adduct of 5,8-dimethyl-6-dodecyne-5,8-diol (moles of ethylene oxide added 20, moles of propylene oxide added 20, w1=7 moles, w2=7 moles, x1=10 moles, x2=10 moles, y1=3 moles, y2=3 moles, z1=z2=0 mole)

A-6: alkylene oxide adduct of 2,4,7,9-tetramethyl-5-decyne-4,7-diol (moles of ethylene oxide added 15, moles of propylene oxide added 15, m=13 moles, n=17 moles)

A-7: alkylene oxide adduct of 2,5,8,11-tetramethyl-6-dodecyne-5,8-diol (moles of ethylene oxide added 20, moles of propylene oxide added 20, m=20 moles, n=20 moles)

A-8: alkylene oxide adduct of 5,8-dimethyl-6-dodecyne-5,8-diol (moles of ethylene oxide added 10, moles of propylene oxide added 10, m=12 moles, n=8 moles)

A-9: alkylene oxide adduct of 3,6-dimethyl-4-octyne-3,6-diol (moles of ethylene oxide added 55, moles of propylene oxide added 55, m=60 moles, n=50 moles, m+n=110 moles)

A-10: alkylene oxide adduct of 2,4,7,9-tetramethyl-5-decyne-4,7-diol (moles of ethylene oxide added 60, moles of propylene oxide added 60, m=60 moles, n=60 moles, m+n=120 moles)

Component B
B-1: sodium di(2-ethylhexyl)sulfosuccinate
B-2: potassium di(2-ethylhexyl)sulfosuccinate
B-3: sodium 1,3-dimethylbutylsulfosuccinate
B-4: sodium n-hexylsulfosuccinate than as specifically described without departing from the scope of the appended claims.

The invention claimed is:

1. An ink additive comprising
(A) 10 to 90% by weight of at least one acetylene glycol selected from the group consisting of
an acetylene glycol having the general formula (1):

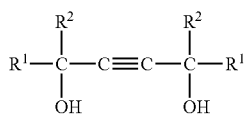

(1)

wherein $R^1$ and $R^2$ each are $C_1$-$C_5$ alkyl, and (B) 10 to 90% by weight of at least one sulfur-containing surfactant selected from compounds having the general formulae (4):

TABLE 2

|  |  | Example | | | | | | | Comparative Example | | | | | | | |
|---|---|---|---|---|---|---|---|---|---|---|---|---|---|---|---|---|
|  |  | 1 | 2 | 3 | 4 | 5 | 6 | 7 | 1 | 2 | 3 | 4 | 5 | 6 | 7 | 8 |
| Ink additive |  | M-1 | M-2 | M-3 | M-4 | M-5 | M-6 | M-7 | M-8 | M-9 | M-10 | M-11 | M-12 | M-13 | M-14 | M-15 |
| Aqueous solution appearance |  | ○ | ○ | ○ | ○ | ○ | ○ | ○ | X | ○ | X | X | ○ | ○ | ○ | ○ |
| Contact angle (°) |  | 24 | 23 | 29 | 39 | 43 | 38 | 36 | 54 | 47 | 55 | 78 | 50 | 81 | 75 | 79 |
| Dynamic surface tension (mN/m) | 1 Hz | 27.2 | 26.0 | 29.5 | 36.5 | 39.5 | 32.0 | 31.5 | 29.5 | 28.5 | 34.9 | 53.0 | 32.0 | 51.5 | 50.2 | 52.5 |
|  | 10 Hz | 31.6 | 28.4 | 34.2 | 42.1 | 45.2 | 36.2 | 36.5 | 34.0 | 32.5 | 38.5 | 59.0 | 36.0 | 58.4 | 57.3 | 56.4 |
| Static surface tension (mN/m) |  | 26.1 | 24.3 | 28.2 | 36.0 | 37.5 | 30.4 | 30.5 | 29.0 | 28.1 | 33.0 | 51.0 | 30.4 | 50.5 | 50.0 | 51.0 |
| Component B |  | B-1 | B-2 | B-3 | B-4 | B-1 | B-2 | B-3 | B-1 | B-1 | B-2 | B-3 | B-4 | B-1 | B-2 | B-3 |

TABLE 3

|  |  | Example | | | | | | |
|---|---|---|---|---|---|---|---|---|
|  |  | 1 | 2 | 3 | 4 | 5 | 6 | 7 |
| Ink composition |  | Ink-1 | Ink-2 | Ink-3 | Ink-4 | Ink-5 | Ink-6 | Ink-7 |
| Print density |  | 1.07 | 1.06 | 1.01 | 0.98 | 0.99 | 1.03 | 1.06 |
| Dot diameter |  | 239 | 238 | 248 | 229 | 230 | 240 | 229 |
| Resolution of printed image | B | 1.31 | 1.42 | 1.29 | 1.26 | 1.25 | 1.32 | 1.32 |
|  | M | 1.48 | 1.49 | 1.45 | 1.40 | 1.36 | 1.40 | 1.52 |
|  | C | 1.81 | 1.87 | 1.82 | 1.79 | 1.78 | 1.71 | 1.83 |
|  | Y | 1.46 | 1.42 | 1.41 | 1.39 | 1.41 | 1.43 | 1.49 |
| Ink receptivity |  | ○ | ○ | ○ | ○ | ○ | ○ | ○ |

|  |  | Comparative Example | | | | | | | |
|---|---|---|---|---|---|---|---|---|---|
|  |  | 1 | 2 | 3 | 4 | 5 | 6 | 7 | 8 |
| Ink composition |  | Ink-8 | Ink-9 | Ink-10 | Ink-11 | Ink-12 | Ink-13 | Ink-14 | Ink-15 |
| Print density |  | 0.96 | 0.81 | 0.79 | 0.72 | 0.82 | 0.79 | 0.73 | 0.77 |
| Dot diameter |  | 255 | 274 | 275 | 289 | 276 | 284 | 277 | 280 |
| Resolution of printed image | B | 1.19 | 1.13 | 1.14 | 1.13 | 1.14 | 1.11 | 1.11 | 1.17 |
|  | M | 1.36 | 1.33 | 1.26 | 1.17 | 1.35 | 1.19 | 1.16 | 1.25 |
|  | C | 1.26 | 1.14 | 1.36 | 1.11 | 1.26 | 1.28 | 1.18 | 1.30 |
|  | Y | 1.25 | 1.36 | 1.25 | 1.18 | 1.24 | 1.26 | 1.19 | 1.16 |
| Ink receptivity |  | Δ | X | X | X | X | X | X | X |

Japanese Patent Application No. 2003-387508 is incorporated herein by reference.

Although some preferred embodiments have been described, many modifications and variations may be made thereto in light of the above teachings. It is therefore to be understood that the invention may be practiced otherwise

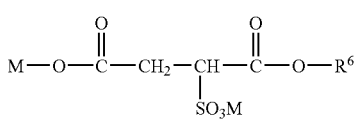

(4)

wherein M is independently an alkali metal, alkaline earth metal or ammonium group, and $R^6$ is independently hydrogen or a $C_1$-$C_{20}$ alkyl group, wherein a 0.1 wt % aqueous solution of said ink additive has a contact angle of equal to or less than 60 degrees after 30 seconds from dropping and a dynamic surface tension of equal to or less than 50 mN/m both at 1 Hz and 10 Hz.

2. The ink additive of claim 1 wherein 20 to 80% by weight of component (A) and 15 to 75% by weight of component (B) are present, and the ink additive further comprises 5 to 15% by weight of deionized water or a water-soluble organic solvent.

3. The ink additive of claim 2, comprising the water-soluble organic solvent which is selected from the group consisting of ethylene glycol, diethylene glycol, triethylene glycol, tetraethylene glycol, polyethylene glycol, propylene glycol, 1,3-propane diol, 1,4-butane diol, and glycerin.

4. The ink additive of claim 1 wherein in formulae (4), M is sodium or potassium.

5. The ink additive of claim 1 wherein the sulfur-containing surfactant is selected from the group consisting of disodium 2-ethylhexylsulfosuccinate, and dipotassium 2-ethylhexyl-sulfosuccinate.

6. An ink composition prepared using the ink additive of claim 1.

7. An ink composition comprising 0.05 to 10% by weight of an additive, said additive comprising
(A) 10 to 90% by weight of at least one acetylene glycol selected from the group consisting of
an acetylene glycol having the general formula (1):

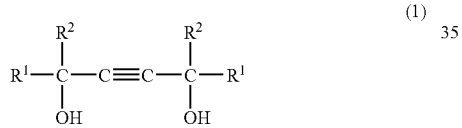

wherein $R^1$ and $R^2$ each are $C_1$-$C_5$ alkyl,
(B) 10 to 90% by weight of at least one sulfur-containing surfactant selected from compounds having the general formulae (4) and (5):

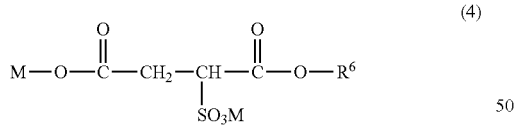

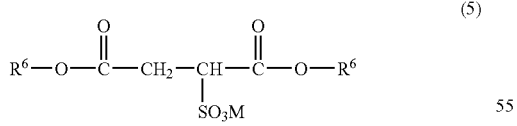

wherein M is independently an alkali metal, alkaline earth metal or ammonium group, and $R^6$ is independently hydrogen or a $C_1$-$C_{20}$ alkyl group,
wherein a 0.1 wt % aqueous solution of said additive has a contact angle of equal to or less than 60 degrees after 30 seconds from dropping and a dynamic surface tension of equal to or less than 50 mN/m both at 1 Hz and 10 Hz.

8. An ink composition comprising
(1) 0.05 to 10% by weight of the additive of claims 1,
(2) 1 to 10% by weight of a dye,
(3) 0 to 50% by weight of an organic solvent, and
(4) 30 to 98.95% by weight of water.

9. An ink additive comprising
(A) 10 to 90% by weight of at least one acetylene glycol selected from the group consisting of
an ethylene oxide/propylene oxide block adduct of acetylene glycol having the general formula (2):

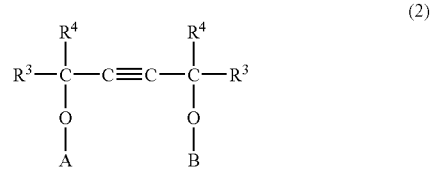

wherein $R^3$ and $R^4$ each are $C_1$-$C_3$ alkyl,
A is —$(C_2H_4O)_{w1}$—$(C_3H_6O)_{x1}$—$(C_2H_4O)_{y1}$—$(C_3H_6O)_{z1}$—H,
B is —$(C_2H_4O)_{w2}$—$(C_3H_6O)_{x2}$—$(C_2H_4O)_{y2}$—$(C_3H_6O)_{z2}$—H,
w1, w2, x1, x2, y1y2, z1 and z2 each are 0 or a positive number of 0.5 to 25,
w1+w2+y1+y2 is 0.5 to 50,
x1+x2+z1+z2 is 0.5 to 50, and
w1+w2+x1+x2+y1+y2+z1+z2 is 1 to 100, and
an ethylene oxide/propylene oxide random adduct of acetylene glycol having the general formula (3):

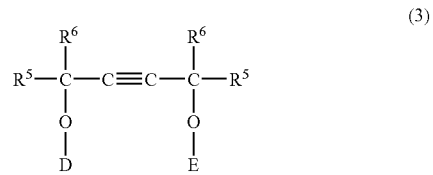

wherein $R^5$ and $R^6$ each are $C_1$-$C_5$ alkyl,
D is —$(C_2H_4O/C_3H_6O)_m$—H,
E is —$(C_2H_4O/C_3H_6O)_n$—H,
m and n each are 0 or a positive number of 0.5 to 50, and
m+n is 1 to 100, and
(B) 10 to 90% by weight of at least one sulfur-containing surfactant selected from compounds having the general formulae (4) and (5):

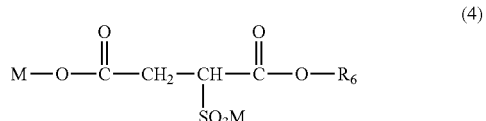

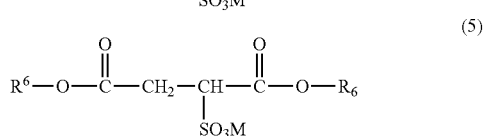

wherein M is independently an alkali metal, alkaline earth metal or ammonium group,
and $R^6$ is independently hydrogen or a $C_1$-$C_{20}$ alkyl group,
wherein a 0.1 wt % aqueous solution of said ink additive has a contact angle of equal to or less than 60 degrees after 30 seconds from dropping and a dynamic surface tension of equal to or less than 50 mN/m both at 1 Hz and 10 Hz.

10. The ink additive of claim 9 wherein 20 to 80% by weight of component (A) and 15 to 75% by weight of component (B) are present, and the ink additive further comprises 5 to 15% by weight of deionized water or a water-soluble organic solvent.

11. The ink additive of claim 10, comprising the water-soluble organic solvent which is selected from the group consisting of ethylene glycol, diethylene glycol, triethylene glycol, tetraethylene glycol, polyethylene glycol, propylene glycol, 1,3-propane diol, 1,4-butane diol, and glycerin.

12. The ink additive of claim 9 wherein in formulae (4) and (5), M is sodium or potassium.

13. The ink additive of claim 9 wherein the sulfur-containing surfactant is selected from the group consisting of sodium n-hexylsulfosuccinate, sodium dihexylsulfosuccinate, sodium dioctylsulfosuccinate, sodium di(2-ethylhexyl)sulfosuccinate, potassium di(2-ethylhexyl)sulfosuccinate, sodium diamylsulfosuccinate, sodium 1,3-dimethylethylsulfosuccinate, sodium 1,3-dimethylbutylsulfosuccinate, disodium 2-ethylhexylsulfosuccinate, and dipotassium 2-ethylhexylsulfosuccinate.

14. An ink composition prepared using the ink additive of claim 9.

15. An ink composition comprising 0.05 to 10% by weight of an additive, said additive comprising
(A) 10 to 90% by weight of at least one acetylene glycol selected from the group consisting of
an ethylene oxide/propylene oxide block adduct of acetylene glycol having the general formula (2):

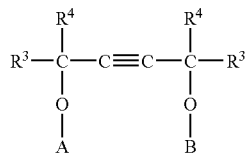
(2)

wherein $R^3$ and $R^4$ each are $C_1$-$C_5$ alkyl,
A is $-(C_2H_4O)_{w1}-(C_3H_6O)_{x1}-(C_2H_4O)_{y1}-(C_3H_6O)_{z1}-H$,
B is $-(C_2H_4O)_{w2}-(C_3H_6O)_{x2}-(C_2H_4O)_{y2}-(C_3H_6O)_{z2}-H$,
w1, w2, x1, x2, y1 y2, z1 and z2 each are 0 or a positive number of 0.5 to 25,
w1+w2+y1+y2 is 0.5 to 50,
x1+x2+z1+z2 is 0.5 to 50, and
w1+w2+x1+x2+y1+y2+z1+z2 is 1 to 100, and
an ethylene oxide/propylene oxide random adduct of acetylene glycol having the general formula (3):

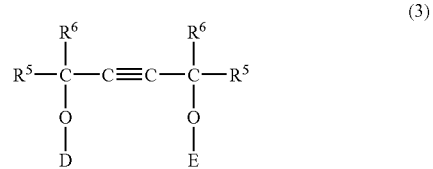
(3)

wherein $R^5$ and $R^6$ each are $C_1$-$C_5$ alkyl,
D is $-(C_2H_4O/C_3H_6O)_m-H$,
E is $-(C_2H_4O/C_3H_6O)_n-H$,
m and n each are 0 or a positive number of 0.5 to 50, and
m+n is 1 to 100, and
(B) 10 to 90% by weight of at least one sulfur-containing surfactant selected from compounds having the general formulae (4) and (5):

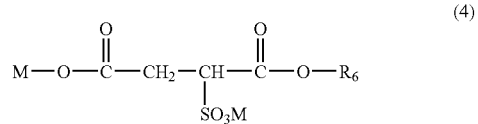
(4)

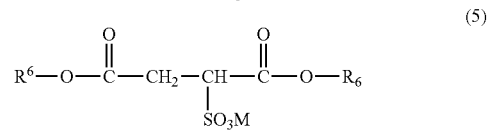
(5)

wherein M is independently an alkali metal, alkaline earth metal or ammonium group,
and $R^6$ is independently hydrogen or a $C_1$-$C_{20}$ alkyl group,
wherein a 0.1 wt % aqueous solution of said ink additive has a contact angle of equal to or less than 60 degrees after 30 seconds from dropping and a dynamic surface tension of equal to or less than 50 mN/m both at 1 Hz and 10 Hz.

16. An ink composition comprising
(1) 0.05 to 10% by weight of the additive of claims 9,
(2) 1 to 10% by weight of a dye,
(3) 0 to 50% by weight of an organic solvent, and
(4) 30 to 98.95% by weight of water.

* * * * *